(12) United States Patent
Agiwal et al.

(10) Patent No.: US 11,343,848 B2
(45) Date of Patent: May 24, 2022

(54) METHOD AND APPARATUS FOR DETERMINING PREAMBLES AND RACH OCCASIONS FOR 2 STEP RANDOM ACCESS

(71) Applicant: Samsung Electronics Co., Ltd., Suwon-si (KR)

(72) Inventors: Anil Agiwal, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/993,126

(22) Filed: Aug. 13, 2020

(65) Prior Publication Data
US 2021/0051708 A1 Feb. 18, 2021

Related U.S. Application Data

(60) Provisional application No. 62/886,862, filed on Aug. 14, 2019.

(30) Foreign Application Priority Data

Aug. 13, 2020 (KR) .................. 10-2020-0101778

(51) Int. Cl.
*H04W 74/00* (2009.01)
*H04W 56/00* (2009.01)
*H04W 74/08* (2009.01)

(52) U.S. Cl.
CPC ....... *H04W 74/008* (2013.01); *H04W 56/001* (2013.01); *H04W 74/0833* (2013.01)

(58) Field of Classification Search
None
See application file for complete search history.

(56) References Cited

U.S. PATENT DOCUMENTS

2017/0251460 A1    8/2017  Agiwal et al.
2019/0208550 A1*   7/2019  Ko ..................... H04L 5/0053
(Continued)

FOREIGN PATENT DOCUMENTS

EP    2269398 B1 *   7/2018  ........ H04W 74/0833
EP    3753196 B1 *  10/2020  ............ H04W 74/08
(Continued)

OTHER PUBLICATIONS

Ericsson, "Procedure for Two-step RACH", 3GPP TSG-RAN WG1 Meeting #97, May 13-17, 2019, R1-1907181, 8 pages.
(Continued)

*Primary Examiner* — Jamaal Henson

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides method and apparatus of determining preamble and RACH occasions for 2-step random access.

20 Claims, 14 Drawing Sheets

(56) References Cited

U.S. PATENT DOCUMENTS

| | | | | |
|---|---|---|---|---|
| 2019/0268947 A1* | 8/2019 | Zhang | ............... | H04W 74/0833 |
| 2020/0146069 A1* | 5/2020 | Chen | ..................... | H04W 76/11 |
| 2020/0221506 A1* | 7/2020 | Jeon | .................. | H04W 74/0833 |
| 2020/0267772 A1* | 8/2020 | Jung | ..................... | H04L 5/0053 |
| 2020/0351801 A1* | 11/2020 | Jeon | ...................... | H04W 52/48 |
| 2022/0053576 A1* | 2/2022 | Lu | .................... | H04W 74/0833 |

FOREIGN PATENT DOCUMENTS

| | | | | |
|---|---|---|---|---|
| EP | 3753196 B1 * | 10/2021 | ........... | H04L 5/0048 |
| IN | 201817031812 | 1/2019 | | |
| WO | WO-2019098770 A1 * | 5/2019 | ........... | H04L 5/0048 |
| WO | 2019/140344 A1 | 7/2019 | | |
| WO | WO-2020167208 A1 * | 8/2020 | ............ | H04B 7/0695 |
| WO | WO-2020216739 A1 * | 10/2020 | ........ | H04W 74/0833 |

OTHER PUBLICATIONS

ZTE et al., "Further discussions on 2-step RACH procedures", 3GPP TSG RAN WG1 Meeting #97, May 13-17, 2019, R1-1905990, 13 pages.
Huawei et al., "Discussion on 2-step RACH procedure", 3GPP TSG RAN WG1 Meeting #97, May 13-17, 2019, R1-1906051, 12 pages.
LG Electronics, "Discussion on Procedure for 2-step RACH", 3GPP TSG RAN WG1 Meeting #97, May 13-17, 2019, R1-1906718, 13 pages.
International Search Report dated Nov. 17, 2020 in connection with International Patent Application No. PCT/KR2020/010803, 3 pages.
Written Opinion of the International Searching Authority dated Nov. 17, 2020 in connection with International Patent Application No. PCT/KR2020/010803, 4 pages.

* cited by examiner

METHOD AND APPARATUS FOR DETERMINING PREAMBLES AND RACH OCCASIONS FOR 2 STEP RANDOM ACCESS

CROSS-REFERENCE TO RELATED APPLICATION

This application claims the benefit of Provisional Application No. 62/886,862, filed Aug. 14, 2019 and claims foreign priority to Korean Application No. 10-2020-0101778, filed Aug. 13, 2020, the disclosures of which are incorporated by reference herein in their entirety.

BACKGROUND

1. Field

The disclosure relates to a wireless communication system. Specifically, the disclosure relates to an apparatus, a method and a system for determining preambles and random access channel (RACH) occasions for 2-step random access in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on 2-step random access in 5G communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises determining a random access preamble for a 2-step random access based on first information associated with a number of synchronization signal blocks (SSBs) per physical random access channel (PRACH) occasion for the 2-step random access and second information associated with a number of preambles per SSB for the 2-step random access; determining a PRACH occasion for the 2-step random access based on third information associated with a PRACH configuration index; and transmitting, to a base station, a message A (MSG A) including the random access preamble based on the PRACH occasion.

In accordance with another aspect of the disclosure, a method performed by a base station is provided. The method comprises transmitting, to a terminal, a message including first information associated with a number of synchronization signal blocks (SSBs) per physical random access channel (PRACH) occasion for a 2-step random access, second information associated with a number of preambles per SSB for the 2-step random access, and third information associated with a PRACH configuration index; and receiving, from the terminal, a message A (MSG A) including a random access preamble for the 2-step random access based on a PRACH occasion, wherein the random access preamble for the 2-step random access is determined based on the first information and the second information, and wherein the PRACH occasion for the 2-step random access is determined based on the third information.

In accordance with another aspect of the disclosure, a terminal is provided. The terminal comprises a transceiver configured to transmit and receive a signal; and a controller configured to: determine a random access preamble for a 2-step random access based on first information associated with a number of synchronization signal blocks (SSBs) per physical random access channel (PRACH) occasion for the 2-step random access and second information associated with a number of preambles per SSB for the 2-step random access, determine a PRACH occasion for the 2-step random access based on third information associated with a PRACH configuration index, and transmit, to a base station, a message A (MSG A) including the random access preamble based on the PRACH occasion.

In accordance with another aspect of the disclosure, a base station is provided. The base station comprises a transceiver configured to transmit and receive a signal; and a controller configured to: transmit, to a terminal, a message including first information associated with a number of synchronization signal blocks (SSBs) per physical random access channel (PRACH) occasion for a 2-step random access, second information associated with a number of preambles per SSB for the 2-step random access, and third information associated with a PRACH configuration index, and receive, from the terminal, a message A (MSG A) including a random access preamble for the 2-step random access based on a PRACH occasion, wherein the random access preamble for the 2-step random access is determined based on the first information and the second information, and wherein the PRACH occasion for the 2-step random access is determined based on the third information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
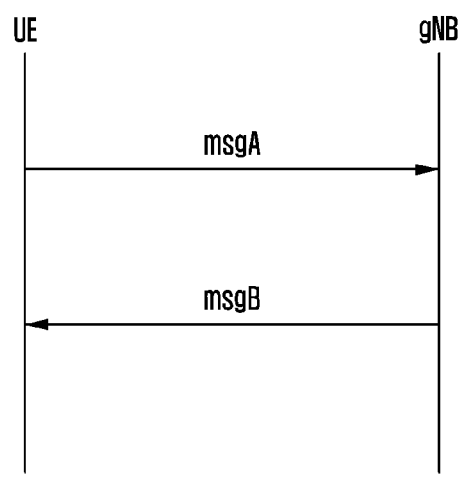
FIG. 1 illustrates a 2-step random access procedure of an embodiment of the disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive MIMO, Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. For example, use cases for the fifth generation wireless communication system wireless system are expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the 5th generation (also referred as NR or New Radio) wireless communication system, random access (RA) procedure is used to achieve uplink time synchronization. RA procedure is used during initial access, handover, radio resource control (RRC) connection re-establishment procedure, scheduling request transmission, secondary cell group (SCG) addition/modification and data or control information transmission in uplink by non-synchronized UE in RRC CONNECTED state.

Legacy CBRA procedure: This is also referred as 4 step CBRA. In this type of random access, UE first transmits Random Access Preamble (also referred as Msg1) and then waits for Random Access Response (RAR) or Msg2 in the RAR window corresponding to its Random Access Preamble transmission. Next generation node B (gNB) transmits the RAR on physical downlink shared channel (PDSCH) addressed to RA-radio network temporary identifier (RNTI). RA-RNTI identifies the time-frequency resource (also referred as PRACH Occasion or PRACH TX Occasion or RACH Occasion) in which Random Access Preamble was detected by gNB. The maximum size of RAR-Window is one radio frame i.e. 10 ms. The RA-RNTI is calculated as follows: RA-RNTI=1+s_id+14*t_id+14*80*f_id+14*80*8*ul_carrier_id, where

- s_id is the index of the first orthogonal frequency division multiplexing (OFDM) symbol of the PRACH occasion where UE has transmitted Msg1 i.e. RA preamble; 0≤s_id<14,
- t_id is the index of the first slot of the PRACH occasion (0≤t_id<80).
- f_id is the index of the PRACH occasion within the slot in the frequency domain (0≤f_id<8)
- ul_carrier_id is the UL carrier used for Msg1 transmission (0 for NUL (normal uplink carrier) and 1 for SUL (supplementary carrier).

Several RARs for various Random Access Preambles detected by gNB can be multiplexed in the same RAR medium access control (MAC) protocol data unit (PDU) by gNB. An RAR in MAC PDU corresponds to UE's Random Access Preamble transmission if it includes random access preamble identifier (RAPID) of Random Access Preamble transmitted by it. If the RAR corresponding to its Random Access Preamble transmission is not received during the RAR window and UE has not yet transmitted the Random Access Preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its Random Access Preamble transmission is received and UE has transmitted a dedicated Random Access Preamble, RA procedure is considered successful. If the UE has transmitted a non-dedicated (i.e. contention based) Random Access Preamble then upon successful reception of RAR, UE transmits Msg3 in UL grant received in RAR. Msg3 includes message such as RRC Connection Request, RRC Connection Re-establishment request, RRC handover confirm, scheduling request, etc. It also includes the UE identity (i.e. cell RNTI (C-RNTI) or serving temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's Contention Resolution Identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the Random Access Preamble for a configurable number of times, UE goes back to first step i.e. select random access resource (preamble/RACH occasion) and transmits the RA preamble. A backoff may be applied before going back to first step.

Contention free random access (CFRA): In the 5th generation (also referred as NR or New Radio) wireless communication system, Contention-free RA (CFRA) Procedure is also supported. Contention free RA procedure is used for scenarios such as handover where low latency is required, timing advance establishment for a secondary cell (SCell), etc. GNB assigns to UE non-contention RA preamble in dedicated signaling. UE transmits the assigned non-contention RA preamble. GNB transmits the RAR on PDSCH addressed to RA-RNTI. RAR conveys RA preamble identifier and Timing alignment information. RAR may also include UL grant. RAR is transmitted in RAR window similar to contention based RA procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So, during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e., gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the MsgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

For performing CBRA, RACH configuration is signaled in system information (i.e. SIB 1) and in dedicated RRC signaling. RACH configuration in SIB 1 is used by UE in RRC IDLE and RRC INACTIVE.

Contention based RACH configuration includes prach-ConfigurationIndex which indicates the available set of PRACH occasions for the transmission of the Random Access Preamble. The number of PRACH occasions in PRACH configuration period is pre-defined for each PRACH configuration index. PRACH configuration period for each PRACH configuration index is also pre-defined. A pre-defined PRACH configuration table lists s number of configurations, wherein each configuration indicates a number of PRACH occasions in PRACH configuration period, the PRACH configuration period, and a location of PRACH occasions in PRACH configuration period. PRACH configuration index is an index to an entry in this PRACH configuration table.

Contention based RACH configuration also include ssb-perRACH-OccasionAndCB-PreamblesPerSSB. ssb-perRACH-OccasionAndCB-PreamblesPerSSB indicates CB-PreamblesPerSSB (R) and ssb-perRACH-Occasion (N).

Based on ssb-perRACH-Occasion and number of SSBs transmitted in cell, PRACH occasions configured by prach-ConfigurationIndex are mapped to SSBs. The number of SSBs transmitted in cell is signaled by gNB in system information and dedicated RRC signaling message. PRACH occasions are mapped to SSBs over association period. The association period starting from system frame number (SFN) 0 is the period in which all SSBs are mapped to PRACH occasions at least once. In an example, the association period can be equal to {1, 2, 4, 8, 16} PRACH Configuration periods.

If N<1, one SSB is mapped to 1/N consecutive valid PRACH occasions and R contention based preambles with consecutive indexes associated with the SSB per valid PRACH occasion start from preamble index 0. If N≥1, R contention based preambles with consecutive indexes associated with SSB n, $0 \leq n \leq N-1$, per valid PRACH occasion start from preamble index $n \cdot N_{preamble}^{total}/N$ where $N_{preamble}^{total}$ is provided by totalNumberOfRA-Preambles and is an integer multiple of N. totalNumberOfRA-Preambles is signaled by gNB in RACH configuration.

In 4 step CBRA, UE first selects a suitable SSB where an SSB is suitable if synchronization signal reference signal received power (SS-RSRP) of that SSB is above rsrp-ThresholdSSB. Selection of a suitable SSB amongst multiple suitable SSBs is up to UE implementation. If a suitable SSB is not available, UE can select any SSB. Random Access Preamble and PRACH occasion are then selected corresponding to the selected SSB.

In 2 step RA, gNB needs to transmit MsgB upon receiving MsgA. In order to enable gNB to avoid transmission of MsgB in directions of all SSBs, SSB should be selected in same manner as selected for Msg1 and informed to gNB via MsgA. Random Access Preamble and PRACH occasion should be then selected corresponding to the selected SSB. In a cell both 2 step and 4 step CBRA can be configured. Issue is how to determine which PRACH occasions and preambles are associated with 2 step CBRA and which PRACH occasions and preambles are associated with 4 step CBRA.

Embodiment 1—Determination of PRACH Occasions

Figure 2:
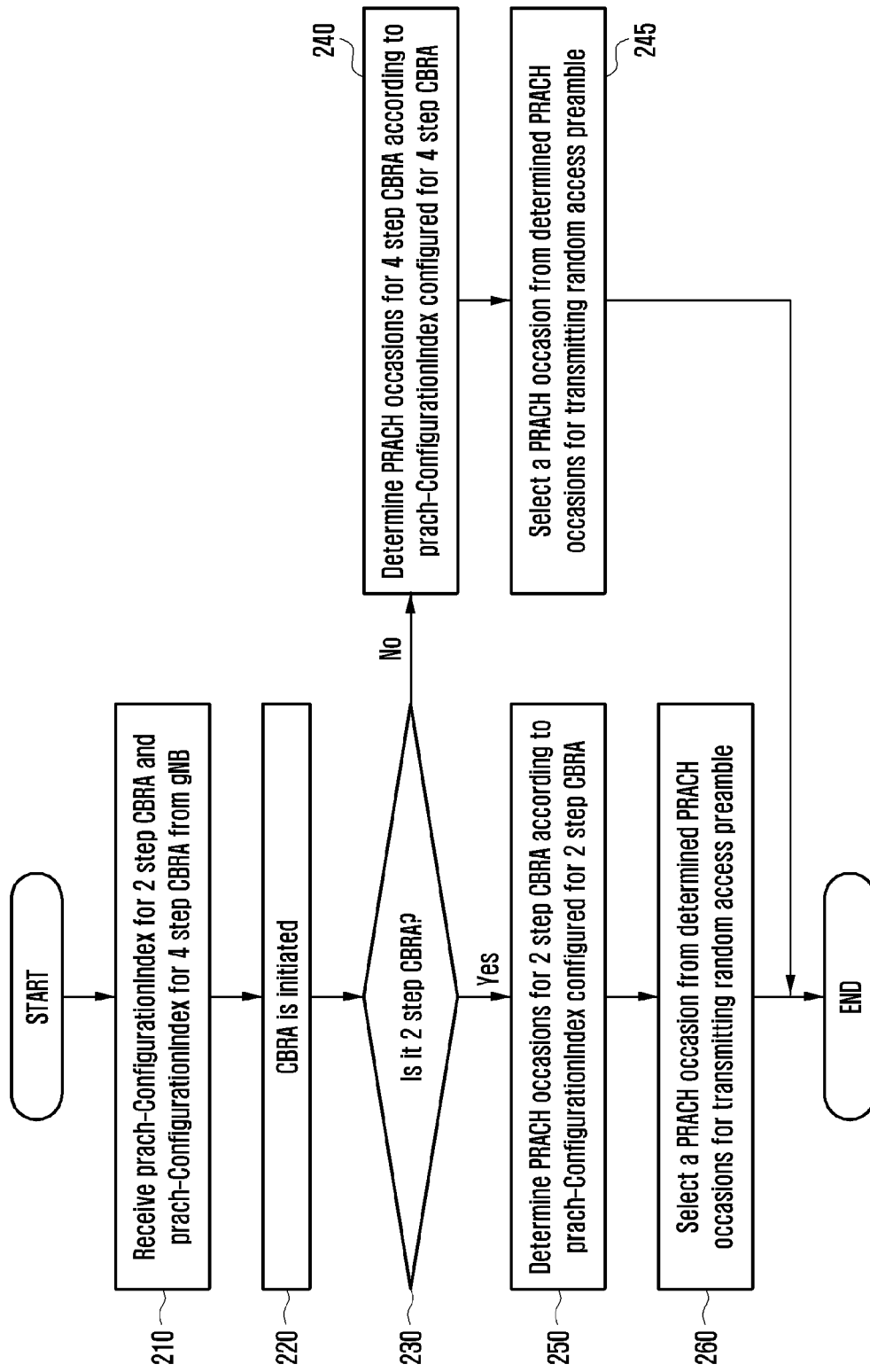
FIG. 2 illustrates a flow chart of determining RACH (or, physical RACH, PRACH) occasion in accordance with an embodiment of the disclosure.
Figure 3:
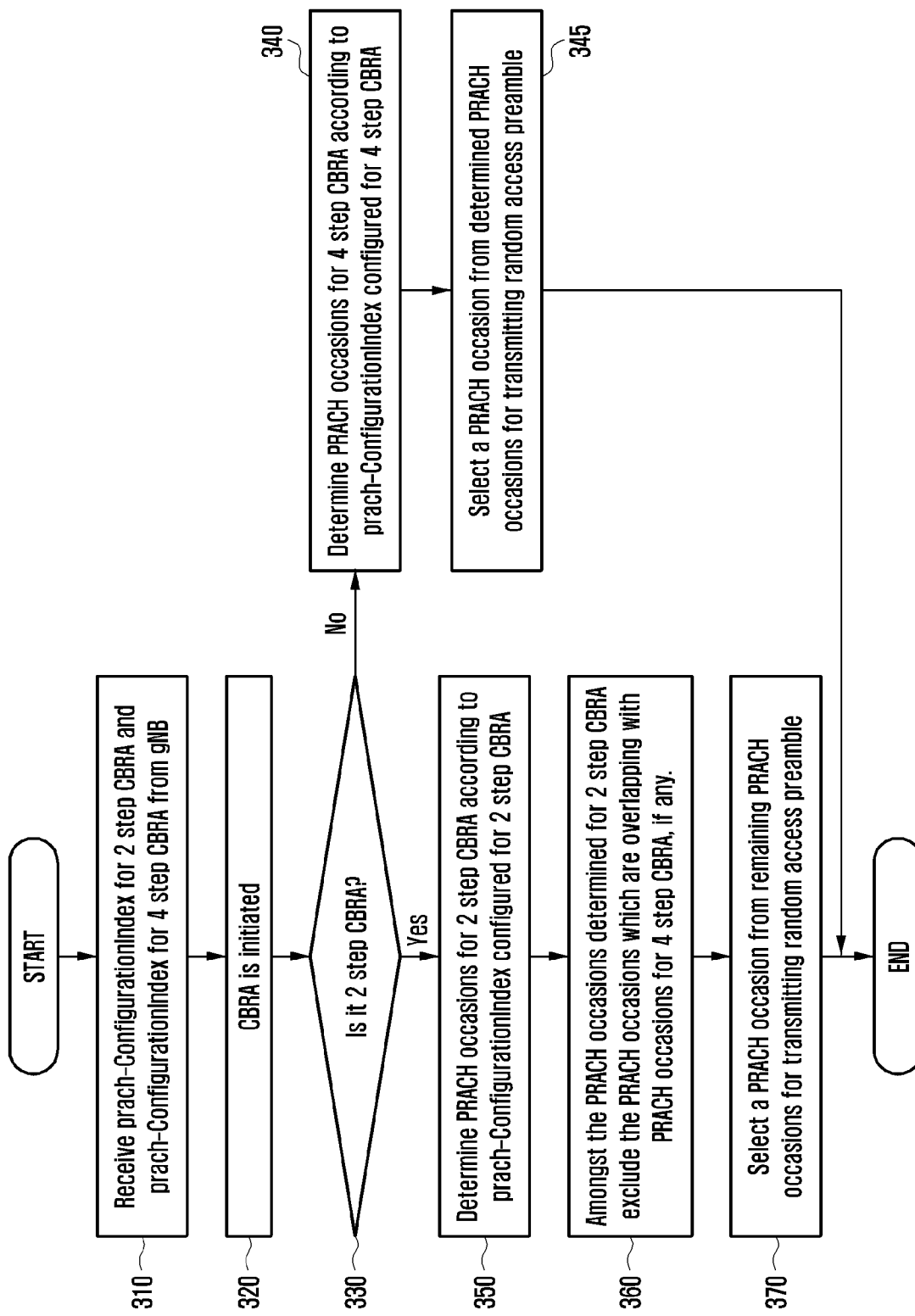
FIG. 3 illustrates a flow chart of determining RACH (or, PRACH) occasion in accordance with an embodiment of the disclosure.

FIG. 2 and FIG. 3 illustrate flow charts of determining PRACH occasion in accordance with an embodiment 1-1 of the disclosure.

Embodiment 1-1: In one embodiment of this disclosure, it is proposed that that parameter prach-ConfigurationIndex is separately signaled for 2 step CBRA and 4 step CBRA in SIB 1 and in dedicated RRC signaling message (e.g. RRC Reconfiguration) (210, 310). If the CBRA initiated by UE/GNB is 2 step CBRA (220, 230, 320, 330), UE determines PRACH occasions for 2 step CBRA according to prach-ConfigurationIndex configured/signaled by gNB for 2 step CBRA (250, 260). If the CBRA initiated by UE/GNB is 4 step CBRA, UE determines PRACH occasions for 4 step CBRA according to prach-ConfigurationIndex configured/signaled by gNB for 4 step CBRA (240, 245, 340, 345). A pre-defined PRACH configuration table lists number of configurations wherein each configuration indicates PRACH configuration period, number of PRACH occasions in PRACH configuration period, location (i.e. OFDM symbols/slots) of PRACH occasions in PRACH configuration period. PRACH configuration index is an index to an entry in this PRACH configuration table.

prach-ConfigurationIndex for 2 step CBRA can be configured/signaled by gNB in 2 step CBRA configuration (e.g. in RACH-ConfigCommon IE for 2 step) and prach-ConfigurationIndex for 4 step CBRA can be configured/signaled by gNB in 4 step CBRA configuration (e.g. in RACH-ConfigCommon IE for 4 step). Alternately, prach-ConfigurationIndex for 2 step CBRA and prach-ConfigurationIndex for 4 step CBRA can be configured/signaled by gNB in CBRA configuration (i.e. in RACH-ConfigCommon IE which is common for both 2 step and 4 step CBRA). It is to be noted that RACH configuration is signaled by gNB per bandwidth part (BWP) and UE uses the RACH configuration corresponding to the BWP on which UE is transmitted the random access preamble. RACH configuration is signaled in SIB 1 and in dedicated RRC signaling message.

FIG. 3 illustrates a flow chart of determining PRACH occasion in accordance with an embodiment of the disclosure.

In an embodiment of this method, amongst the PRACH occasions determined for 2 step CBRA based on prach-ConfigurationIndex configured/signaled by gNB for 2 step CBRA (350), UE excludes the PRACH occasions which are overlapping with PRACH occasions for 4 step CBRA (360, 370). PRACH occasions for 4 step CBRA are determined based on prach-ConfigurationIndex configured/signaled by gNB for 4 step CBRA.

The PRACH occasions remaining after the exclusion are mapped to SSBs. Note that PRACH occasions in association period are sequentially numbered first in frequency and then in time domain. SSBs are mapped to these PRACH occasions in increasing order of SSB indexes. SSBs associated with a PRACH occasion are sequentially numbered starting from lower SSB index to higher SSB index. If ssb-per-RACH-Occasion (N1) is less than 1, only one SSB is mapped to a PRACH occasion and each SSB is mapped to 1/N1 PRACH occasions. If ssb-perRACH-Occasion (N1) is >=1, N1 SSBs are mapped to each PRACH occasions. UE select a PRACH occasion from remaining PRACH occasions after exclusion for transmitting random access preamble. PRACH occasion is selected from PRACH occasions corresponding to SSB selected by UE.

Figure 4:
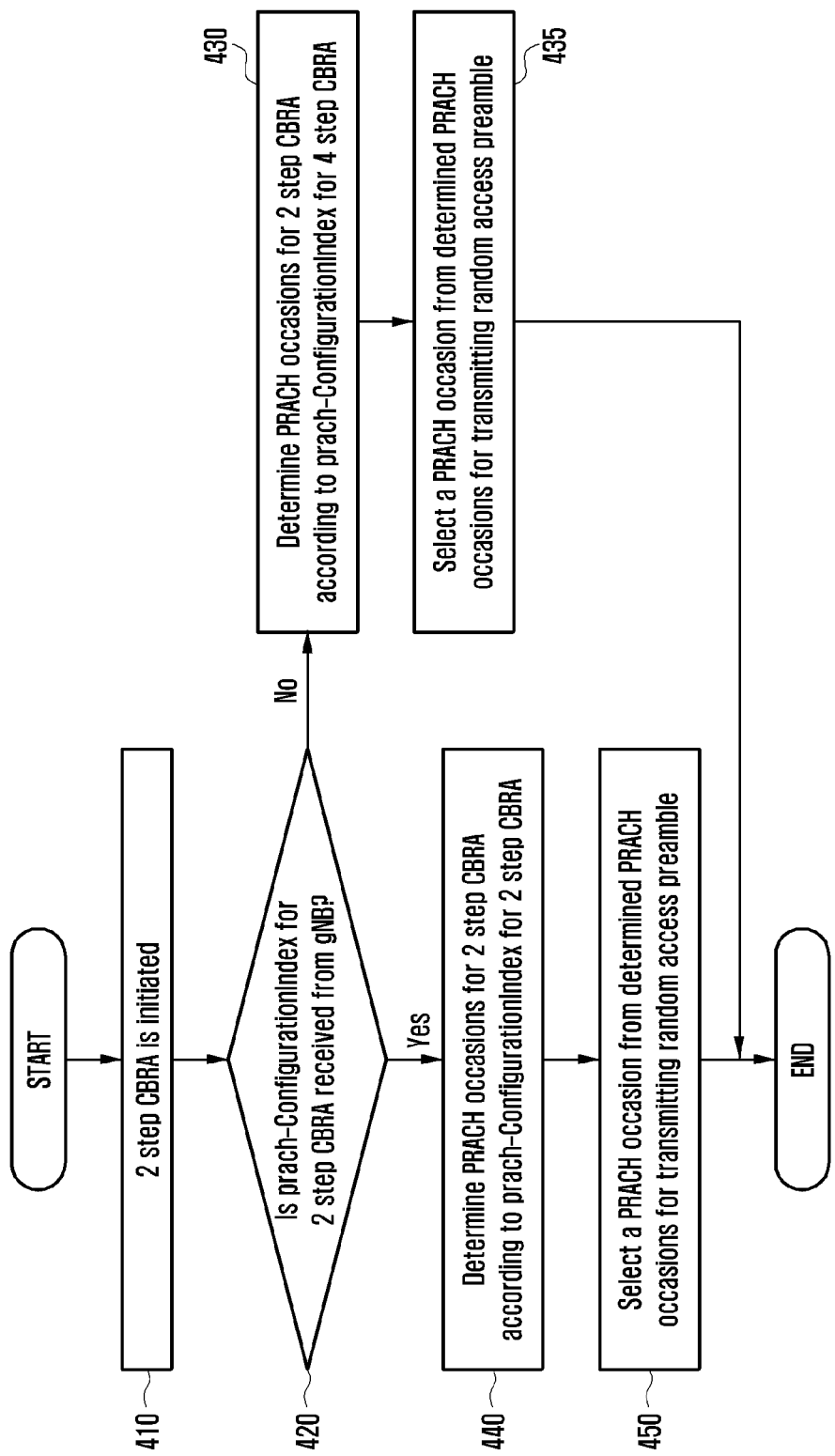
FIG. 4 illustrates a flow chart of determining RACH (or, PRACH) occasion in accordance with an embodiment of the disclosure.
Figure 5:
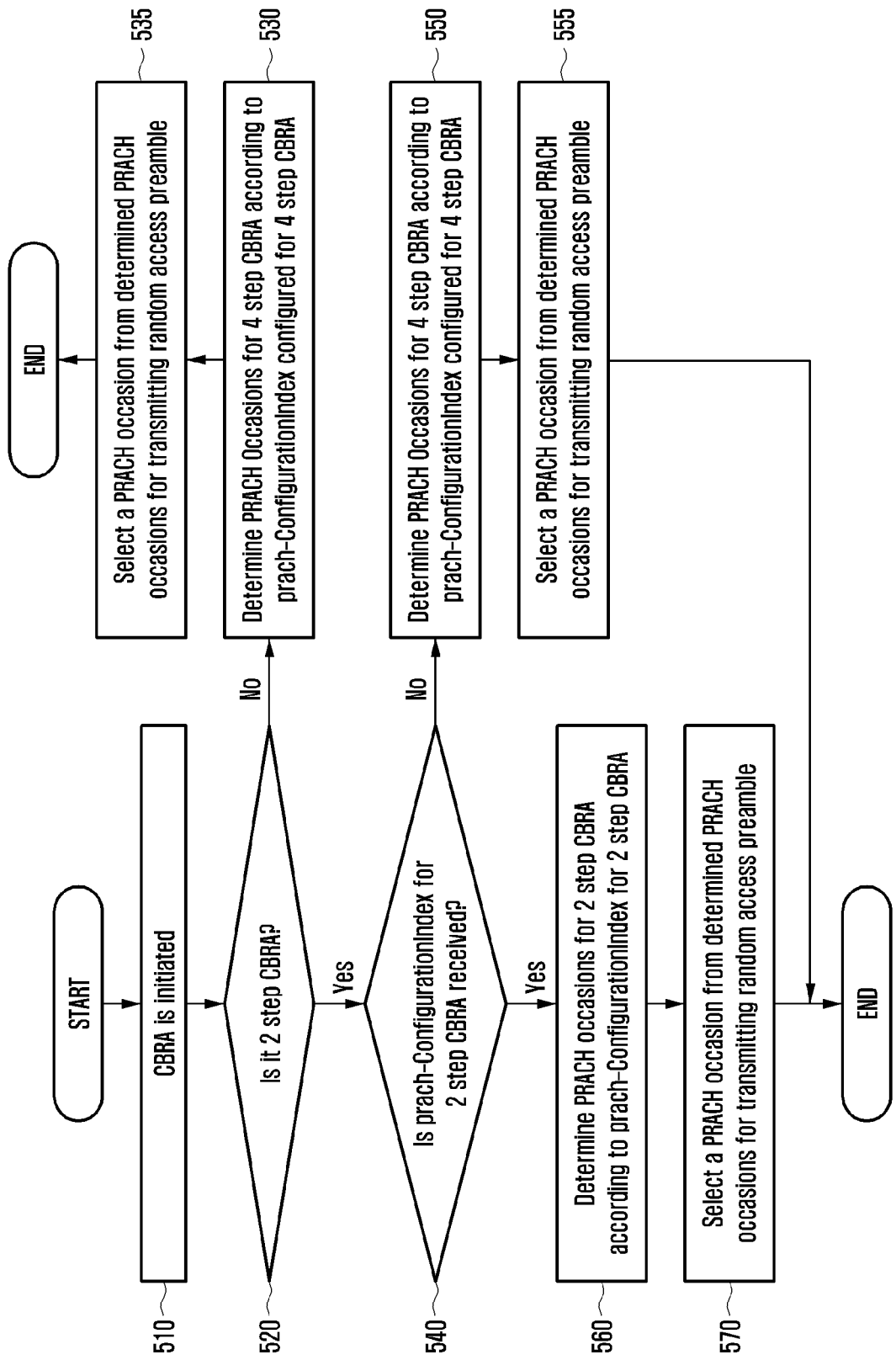
FIG. 5 illustrates a flow chart of determining RACH (or, PRACH) occasion in accordance with an embodiment of the disclosure.

FIG. 4 and FIG. 5 illustrate flow charts of determining PRACH occasion in accordance with an embodiment 1-2 of the disclosure.

Embodiment 1-2: In one embodiment of this disclosure, it is proposed that parameter prach-ConfigurationIndex is separately signaled for 2 step CBRA and 4 step CBRA in SIB 1 and in dedicated RRC signaling message (e.g. RRC Reconfiguration). The gNB has the option to signal or not signal prach-ConfigurationIndex for 2 step CBRA.

If the CBRA initiated by UE/GNB is 2 step CBRA (410, 510), UE determines PRACH occasions for 2 step CBRA according to prach-ConfigurationIndex configured/signaled by gNB for 2 step CBRA if prach-ConfigurationIndex for 2 step CBRA is signaled by gNB (420, 440, 450, 540, 560, 570). If prach-ConfigurationIndex for 2 step CBRA is not signaled by gNB, UE determines PRACH occasions for 2 step CBRA according to prach-ConfigurationIndex configured/signaled by gNB for 4 step CBRA (420, 430, 435, 540, 550, 555). If the CBRA initiated by UE/GNB is 4 step CBRA, UE determines PRACH occasions for 4 step CBRA according to prach-ConfigurationIndex configured/signaled by gNB for 4 step CBRA (520, 530, 535). A pre-defined PRACH configuration table lists number of configurations wherein each configuration indicates PRACH configuration period, number of PRACH occasions in PRACH configuration period, location (symbols/slots) of PRACH occasions in PRACH configuration period. PRACH configuration index is an index to an entry in this PRACH configuration table.

prach-ConfigurationIndex for 2 step CBRA can be configured/signaled by gNB in 2 step CBRA configuration (e.g. in RACH-ConfigCommon IE for 2 step) and prach-ConfigurationIndex for 4 step CBRA can be configured/signaled by gNB in 4 step CBRA configuration (e.g. in RACH-ConfigCommon IE for 4 step). Alternately, prach-ConfigurationIndex for 2 step CBRA and prach-ConfigurationIndex for 4 step CBRA can be configured/signaled by gNB in CBRA configuration (i.e. in RACH-ConfigCommon IE which is common for both 2 step and 4 step CBRA). It is to be noted that RACH configuration is per BWP and UE uses the RACH configuration corresponding to the BWP on which UE is transmitted the random access preamble. RACH configuration is signaled in SIB 1 and in dedicated RRC signaling message.

The PRACH occasions are mapped to SSBs. Note that PRACH occasions in association period are sequentially numbered first in frequency and then in time domain. SSBs are mapped to these PRACH occasions in increasing order of SSB indexes. SSBs associated with a PRACH occasion are sequentially numbered starting from lower SSB index to higher SSB index. If ssb-perRACH-Occasion (N1) is less than 1, only one SSB is mapped to a PRACH occasion and each SSB is mapped to 1/N1 PRACH occasions. If ssb-perRACH-Occasion (N1) is >=1, N1 SSBs are mapped to each PRACH occasions. UE select a PRACH occasion for transmitting random access preamble. PRACH occasion is selected from PRACH occasions corresponding to SSB selected by UE.

Embodiment 2—Determination of Random Access Preambles

Figure 6:
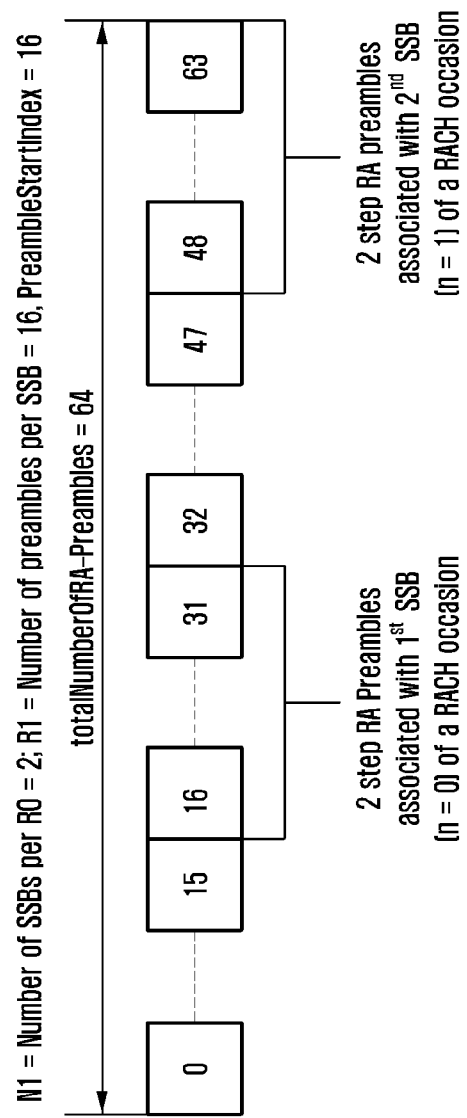
FIG. 6 illustrates a random access preamble determining procedure in accordance with an embodiment of the disclosure.
Figure 7:
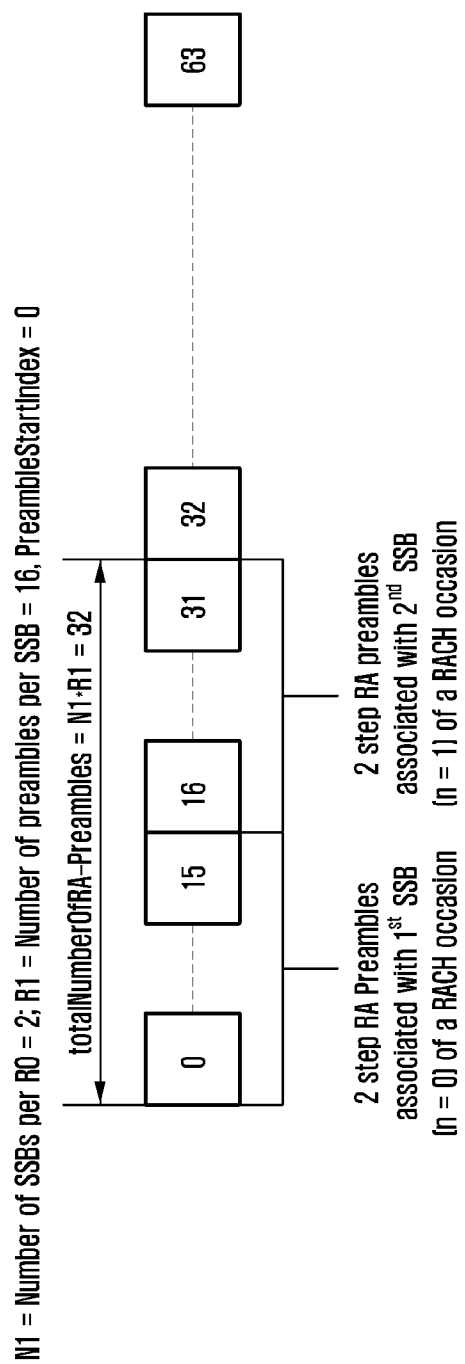
FIG. 7 illustrates a random access preamble determining procedure in accordance with an embodiment of the disclosure.
Figure 8:
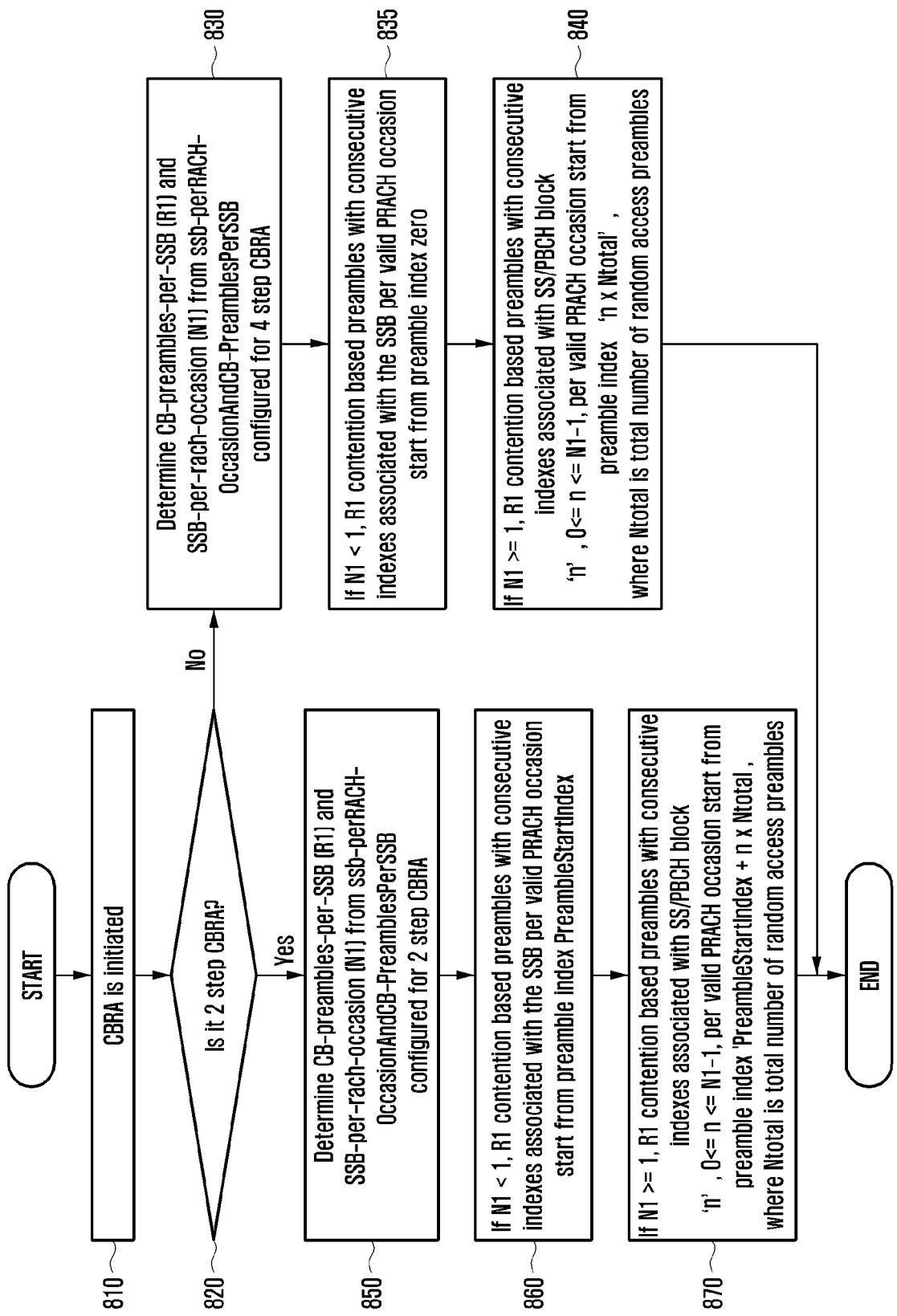
FIG. 8 illustrates a flow chart of determining random access preambles in accordance with an embodiment of the disclosure.

FIG. 6, FIG. 7, and FIG. 8 illustrate random access preamble determining procedures in accordance with embodiments of the disclosure.

Embodiment 2-1: In one embodiment of this disclosure it is proposed that parameter ssb-perRACH-OccasionAndCB-PreamblesPerSSB is separately signaled by gNB for 2 step CBRA and 4 step CBRA in SIB 1 and in dedicated RRC signaling message (e.g. RRC Reconfiguration). For 2 step CBRA parameter PreambleStartIndex is additionally signaled by gNB. The parameter PreambleStartIndex is not signaled for 4 step CBRA.

ssb-perRACH-OccasionAndCB-PreamblesPerSSB for 2 step CBRA can be configured/signaled by gNB in 2 step CBRA configuration (e.g. in RACH-ConfigCommon IE for 2 step) and ssb-perRACH-OccasionAndCB-PreamblesPerSSB for 4 step CBRA can be configured/signaled by gNB in 4 step CBRA configuration (e.g. in RACH-ConfigCommon IE for 4 step). Alternately, ssb-perRACH-OccasionAndCB-PreamblesPerSSB for 2 step CBRA and ssb-perRACH-OccasionAndCB-PreamblesPerSSB for 4 step CBRA can be configured/signaled by gNB in CBRA configuration (i.e. in RACH-ConfigCommon IE which is common for both 2 step and 4 step CBRA). It is to be noted that RACH configuration is per BWP and UE uses the RACH configuration corresponding to the BWP on which UE is transmitted the random access preamble.

If the CBRA initiated by UE/GNB is 2 step CBRA (810, 820), UE determines PRACH preambles for 2 step CBRA as follows (850, 860, 870):

N1: ssb-perRACH-Occasion configured/signaled by gNB for 2 step CBRA.

R1: CB-PreamblesPerSSB configured/signaled by gNB for 2 step CBRA.

If N1<1: Preambles starting from PreambleStartIndex to 'PreambleStartIndex+R1−1' are used for 2 step CB RA (860). Same set of preambles is used for each SSB per PRACH occasion. In other words, R1 contention based preambles with consecutive indexes associated with the SSB per valid PRACH occasion start from preamble index PreambleStartIndex.

If N1>=1, R1 contention based preambles with consecutive indexes associated with SS/PBCH block n, 0≤n≤N1−1, per valid PRACH occasion start from preamble index 'PreambleStartIndex+n·$N_{preamble}^{total}$/N1, where $N_{preamble}^{total}$ is provided by totalNumberOfRA-Preambles (870). In an embodiment, totalNumberOfRA-Preambles is the total number of preambles used for random access (contention based as well as contention free) and is configured by gNB. In another embodiment, it is the total number of preambles used for 2 step CBRA. It can be configured by GNB. Alternatively it is not configured but it is equal to [CB-preambles-per-SSB×max(1, SSB-per-rach-occasion)]. FIG. 6 illustrates an example for N1=2 and R1=16, totalNumberOfRA-Preambles is the total number of preambles used for random access (contention based as well as contention free). FIG. 7 illustrates the case where totalNumberOfRA-Preambles is equal to [CB-preambles-per-SSB×max(1, SSB-per-rach-occasion)].

If the CBRA initiated by UE/GNB is 4 step CBRA (820), UE determines PRACH preambles for 4 step CBRA as follows (830, 835, 840):

N1: ssb-perRACH-Occasion configured/signaled by gNB for 4 step CBRA

R1: CB-PreamblesPerSSB configured/signaled by gNB for 4 step CBRA

If N1<1: Preambles starting from preamble index zero to 'R1−1' are used for 4 step CB RA (835). Same set of preambles is used for each SSB. In other words, R1 contention based preambles with consecutive indexes associated with the SSB per valid PRACH occasion start from preamble index zero.

If N1>=1, R1 contention based preambles with consecutive indexes associated with SS/PBCH block n, 0≤n≤N1−1, per valid PRACH occasion start from preamble index 'n·$N_{preamble}^{total}$/N1, where $N_{preamble}^{total}$ is provided by totalNumberOfRA-Preambles (840). In an embodiment, totalNumberOfRA-Preambles is the total number of preambles used for random access (contention based as well as contention free) and is configured by gNB. In another embodiment, totalNumberOfRA-Preambles is the total number of preambles used for random access (4 step contention based as well as contention free random access) and is configured by gNB.

Figure 9:
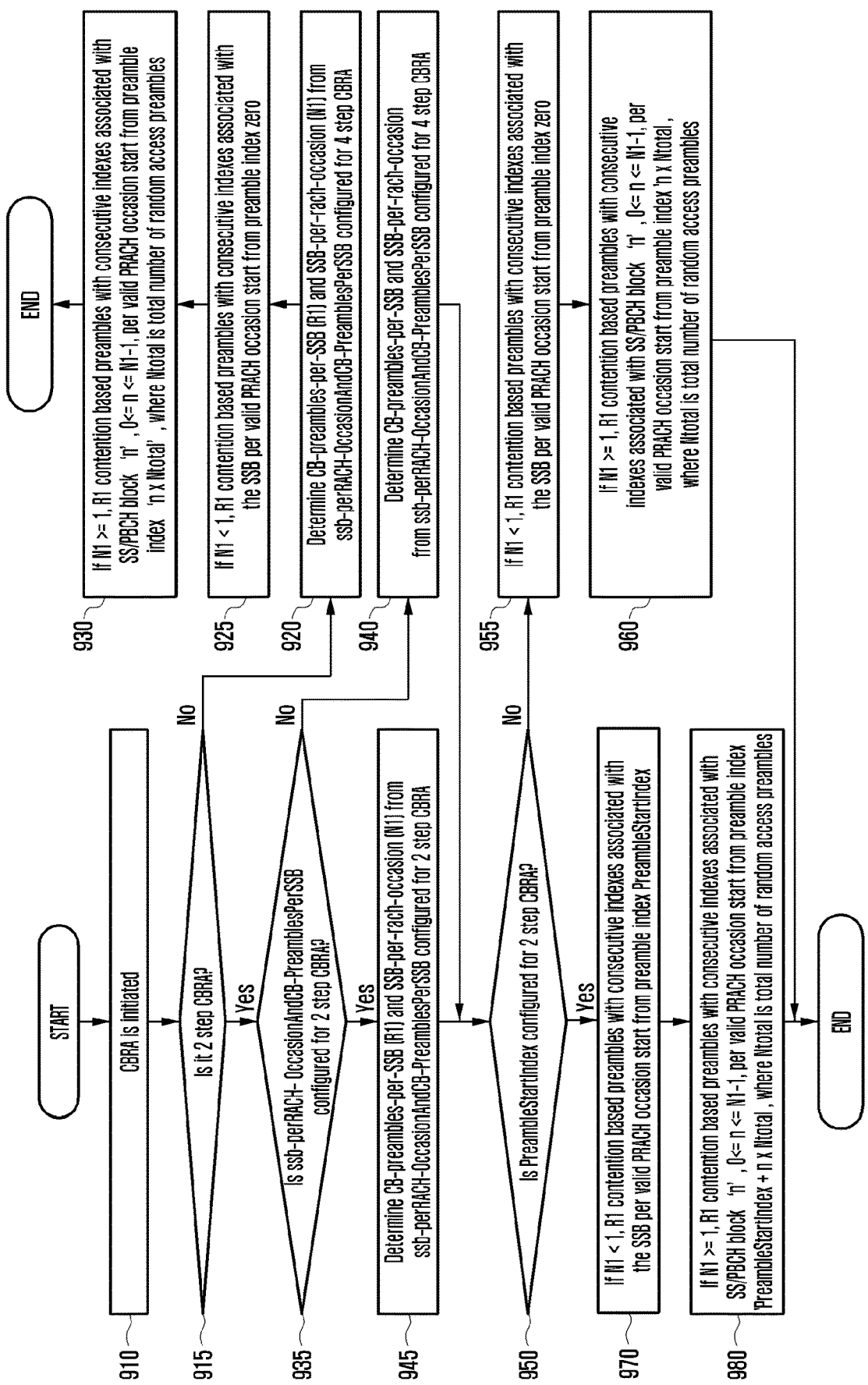
FIG. 9 illustrates a flow chart of determining random access preambles in accordance with an embodiment of the disclosure.

FIG. 9 illustrates a flow chart of determining random access preambles in accordance with an embodiment of the disclosure.

Embodiment 2-2: In one embodiment of this disclosure, it is proposed that that parameter ssb-perRACH-OccasionAndCB-PreamblesPerSSB is separately signaled by gNB for 2 step CBRA and 4 step CBRA in SIB 1 and in dedicated RRC signaling message (e.g. RRC Reconfiguration). ssb-perRACH-OccasionAndCB-PreamblesPerSSB is optionally signaled by GNB for 2 step CBRA. If ssb-perRACH-OccasionAndCB-PreamblesPerSSB is not signaled by gNB for 2 step CBRA, UE uses ssb-perRACH-OccasionAndCB-PreamblesPerSSB signaled for 4 step CBRA for 2 step CBRA.

For 2 step CBRA parameter PreambleStartIndex is optionally signaled by gNB. If PreambleStartIndex is not signaled by gNB for 2 step CBRA, UE assumes PreambleStartIndex is zero. The parameter PreambleStartIndex is not signaled for 4 step CBRA.

ssb-perRACH-OccasionAndCB-PreamblesPerSSB for 2 step CBRA can be configured/signaled by gNB in 2 step CBRA configuration (e.g. in RACH-ConfigCommon IE for 2 step) and ssb-perRACH-OccasionAndCB-PreamblesPerSSB for 4 step CBRA can be configured/signaled by gNB in 4 step CBRA configuration (e.g. in RACH-ConfigCommon IE for 4 step). Alternately, ssb-perRACH-OccasionAndCB-PreamblesPerSSB for 2 step CBRA and ssb-perRACH-OccasionAndCB-PreamblesPerSSB for 4 step CBRA can be configured/signaled by gNB in CBRA configuration (i.e. in RACH-ConfigCommon IE which is common for both 2 step and 4 step CBRA). It is to be noted that RACH configuration is per BWP.

If the CBRA initiated by UE/GNB is 2 step CBRA (910), UE determines PRACH preambles for 2 step CBRA as follows:

N1: ssb-perRACH-Occasion configured/signaled by gNB for 2 step CBRA (915, 935, 945). If ssb-perRACH-Occasion is not signaled for 2 step CBRA, UE applies ssb-perRACH-Occasion configured/signaled by gNB for 4 step CBRA (935, 940).

R1: CB-PreamblesPerSSB configured/signaled by gNB for 2 step CBRA (915, 935, 945). If CB-PreamblesPerSSB is not signaled for 2 step CBRA, UE applies CB-PreamblesPerSSB configured/signaled by gNB or 4 step CBRA (935, 940).

If N1<1: Preambles starting from PreambleStartIndex to 'PreambleStartIndex+R1−1' are used for 2 step CB RA (950, 970). Same set of preambles is used for each SSB. In other words, R1 contention based preambles with consecutive indexes associated with the SSB per valid PRACH occasion start from preamble index PreambleStartIndex. If PreambleStartIndex is not signaled by gNB for 2 step CBRA, UE assumes PreambleStartIndex is zero (950, 955).

If N1>=1, R1 contention based preambles with consecutive indexes associated with SS/PBCH block n, 0≤n≤N1−1, per valid PRACH occasion start from preamble index 'PreambleStartIndex+n·$N_{preamble}^{total}$/N1, where $N_{preamble}^{total}$ is provided by totalNumberOfRA-Preambles (950, 980). In an embodiment, totalNumberOfRA-Preambles is the total number of preambles used for random access (contention based as well as contention free) and is configured by gNB. In another embodiment, it is the total number of preambles used for 2 step CBRA. It can be configured by GNB. Alternatively it is not configured and it can be equal to [CB-preambles-per-SSB×max(1, SSB-per-rach-occasion)]. If PreambleStartIndex is not signaled for 2 step CBRA, UE assumes PreambleStartIndex is zero (950, 960).

If the CBRA initiated by UE/GNB is 4 step CBRA (915), UE determines PRACH preambles for 4 step CBRA as follows:

N1: ssb-perRACH-Occasion configured/signaled by gNB for 4 step CBRA (920)

R1: CB-PreamblesPerSSB configured/signaled by gNB for 4 step CBRA (920)

If N1<1: Preambles starting from preamble index zero to 'R1−1' are used for 4 step CB RA (925). Same set of preambles is used for each SSB. In other words, R1 contention based preambles with consecutive indexes associated with the SSB per valid PRACH occasion start from preamble index zero.

If N1>=1, R1 contention based preambles with consecutive indexes associated with SS/PBCH block n, 0≤n≤N1−1, per valid PRACH occasion start from preamble index 'n·$N_{preamble}^{total}$/N1, where $N_{preamble}^{total}$ is provided by totalNumberOfRA-Preambles (930). In an embodiment, totalNumberOfRA-Preambles is the total number of preambles used for random access (contention based as well as contention free) and is configured by gNB. In another embodiment, totalNumberOfRA-Preambles is the total number of preambles used for random access (4 step contention based as well as contention free random access) and is configured by gNB.

Figure 10:
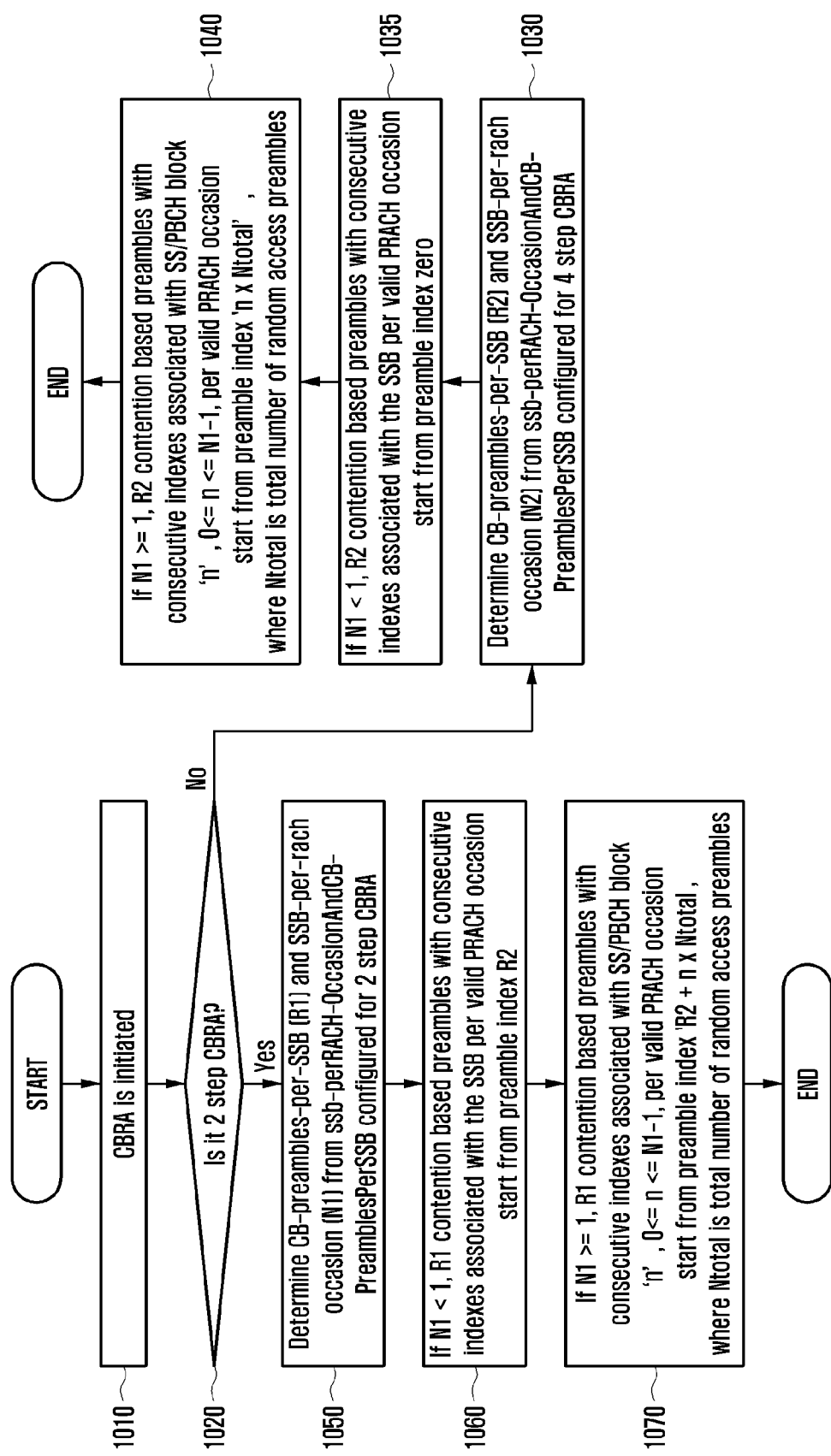
FIG. 10 illustrates a flow chart of determining random access preambles in accordance with an embodiment of the disclosure.
Figure 11:
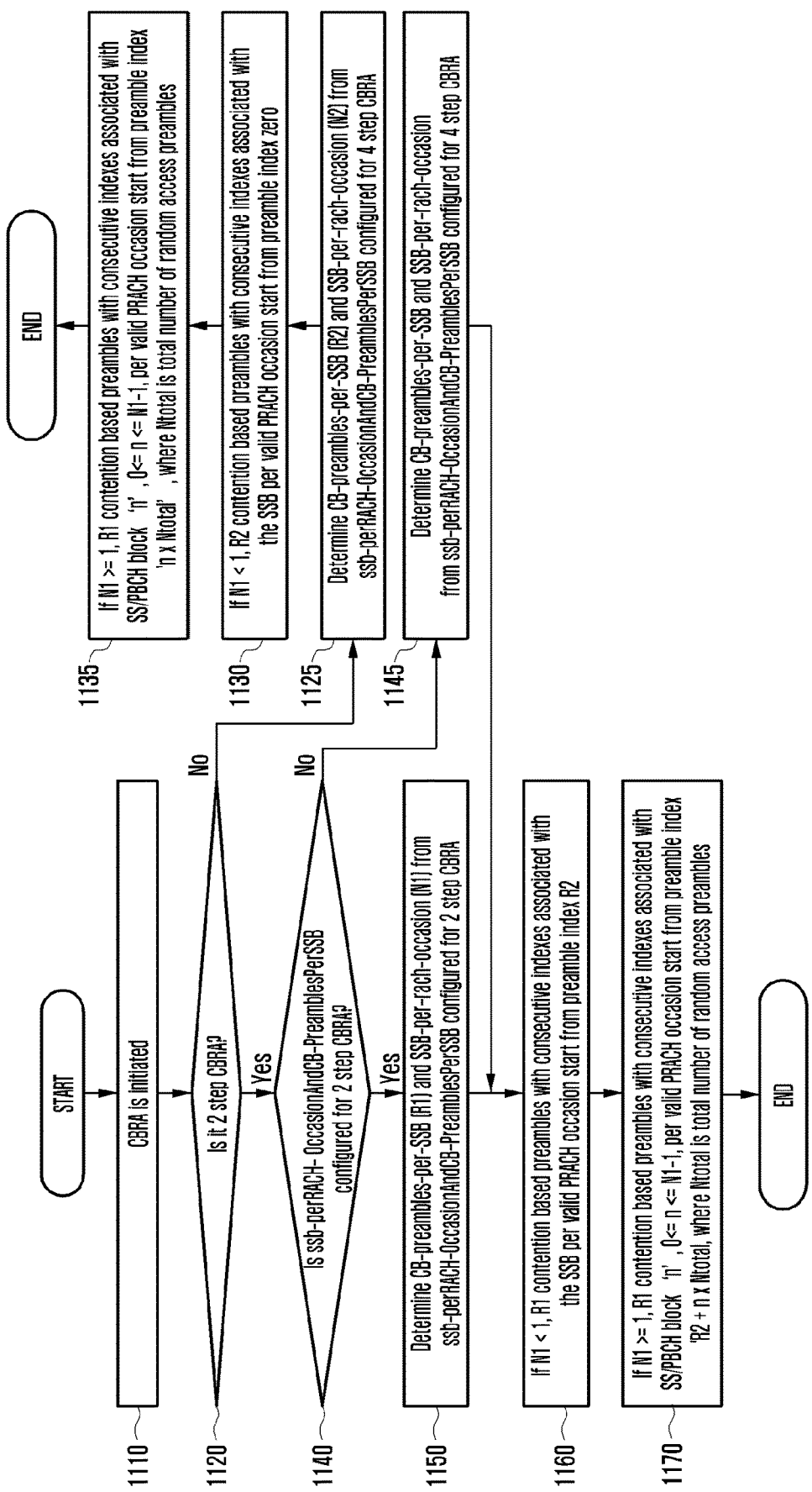
FIG. 11 illustrates a flow chart of determining random access preambles in accordance with an embodiment of the disclosure.

FIG. 10 and FIG. 11 illustrate flow charts of determining random access preambles in accordance with an embodiment of the disclosure.

Embodiment 2-3: In one embodiment of this disclosure it is proposed that that parameter ssb-perRACH-OccasionAndCB-PreamblesPerSSB is separately signaled by gNB for 2 step CBRA and 4 step CBRA in SIB 1 and in dedicated RRC signaling message (e.g. RRC Reconfiguration). ssb-perRACH-OccasionAndCB-PreamblesPerSSB is optionally signaled by GNB for 2 step CBRA. If ssb-perRACH-OccasionAndCB-PreamblesPerSSB is not signaled by gNB for 2 step CBRA, UE uses ssb-perRACH-OccasionAndCB-PreamblesPerSSB signaled for 4 step CBRA for 2 step CBRA.

ssb-perRACH-OccasionAndCB-PreamblesPerSSB for 2 step CBRA can be configured/signaled by gNB in 2 step CBRA configuration (e.g. in RACH-ConfigCommon IE for 2 step) and ssb-perRACH-OccasionAndCB-PreamblesPerSSB for 4 step CBRA can be configured/signaled by gNB in 4 step CBRA configuration (e.g. in RACH-ConfigCommon IE for 4 step). Alternately, ssb-perRACH-OccasionAndCB-PreamblesPerSSB for 2 step CBRA and ssb-perRACH-OccasionAndCB-PreamblesPerSSB for 4 step CBRA can be configured/signaled by gNB in CBRA configuration (i.e. in RACH-ConfigCommon IE which is common for both 2 step and 4 step CBRA). It is to be noted that RACH configuration is per BWP and UE uses the RACH configuration corresponding to the BWP on which UE is transmitted the random access preamble.

If the CBRA initiated by UE/GNB is 2 step CBRA (1010, 1020, 1110, 1120), UE determines PRACH preambles for 2 step CBRA as follows:

N1: ssb-perRACH-Occasion configured/signaled by gNB for 2 step CBRA (1050, 1140, 1150). In an embodiment, if ssb-perRACH-Occasion is not signaled by gNB for 2 step CBRA, UE applies ssb-perRACH-Occasion configured/signaled by gNB for 4 step CBRA (1140, 1145); in this case N1 equals N2, where N2 is ssb-perRACH-Occasion configured/signaled by gNB for 4 step CBRA.

R1: CB-PreamblesPerSSB configured/signaled by gNB for 2 step CBRA (1050, 1140, 1150). In an embodiment, if CB-PreamblesPerSSB is not signaled for 2 step CBRA, UE applies CB-PreamblesPerSSB configured/signaled by gNB for 4 step CBRA (1140, 1145); in this case R1 is equal to R2, where R2 is CB-PreamblesPerSSB configured/signaled by gNB for 4 step CBRA.

N2: ssb-perRACH-Occasion configured/signaled by gNB for 4 step CBRA. If 4 step CBRA is not configured, UE assumes N2 equals to zero.

R2: CB-PreamblesPerSSB configured/signaled by gNB for 4 step CBRA.

If N1<1: Preambles starting from R2 to R2+R1−1' are used for 2 step CB RA (1060, 1160). Same set of preambles is used for each SSB. In other words, R1 contention based preambles with consecutive indexes associated with the SSB per valid PRACH occasion start from preamble index R2. In an embodiment, if 4 step CBRA is not configured, UE assumes R2 equals to zero i.e. R1 contention based preambles with consecutive indexes associated with the SSB per valid PRACH occasion start from preamble index 0. In an embodiment, if PRACH occasions are separately configured for 2 step and 4 step CBRA, R2 is assumed to be zero i.e. R1 contention based preambles with consecutive indexes associated with the SSB per valid PRACH occasion start from preamble index 0. PRACH occasions are separately configured for 2 step and 4 step CBRA if PRACH configuration index is separately configured for 2 step and 4 step. In an embodiment, if PRACH preambles are not partitioned between 2 step and 4 step CBRA, R2 is assumed to be zero i.e. R1 contention based preambles with consecutive indexes associated with the SSB per valid PRACH occasion start from preamble index 0.

If N1>=1, R1 contention based preambles with consecutive indexes associated with SS/PBCH block n, 0≤n≤N1−1, per valid PRACH occasion start from preamble index 'R2+n·$N_{preamble}^{total}$/N1, where $N_{preamble}^{total}$ is provided by totalNumberOfRA-Preambles (1070, 1170). In an embodiment, totalNumberOfRA-Preambles is the total number of preambles used for random access (contention based as well as contention free) and is configured by gNB. In another embodiment, it is the total number of preambles used for 2 step CBRA. It can be configured by GNB. Alternatively it is not configured and can be equal to [CB-preambles-per-SSB×max(1, SSB-per-rach-occasion)]. In an embodiment, if 4 step CBRA is not configured, UE assumes R2 equals to zero i.e. R1 contention based preambles with consecutive indexes associated with SS/PBCH block n, 0≤n≤N1−1, per valid PRACH occasion start from preamble index 'n·$N_{preamble}^{total}$/N1, where $N_{preamble}^{total}$ is provided by totalNumberOfRA-Preambles. In an embodiment, if PRACH occasions are separately configured for 2 step and 4 step CBRA, R2 is assumed to be zero i.e. R1 contention based preambles with consecutive indexes associated with SS/PBCH block n, 0≤n≤N1−1, per valid PRACH occasion start from preamble index 'n·$N_{preamble}^{total}$/N1, where $N_{preamble}^{total}$ is provided by totalNumberOfRA-Preambles. PRACH occasions are separately configured for 2 step and 4 step CBRA if PRACH configuration index is separately configured for 2 step and 4 step. In an embodiment, if PRACH preambles are not partitioned between 2 step and 4 step CBRA, R2 is assumed to be zero i.e. R1 contention based preambles with consecutive indexes associated with SS/PBCH block n, 0≤n≤N1−1, per valid PRACH occasion start from preamble index 'n·$N_{preamble}^{total}$/N1, where $N_{preamble}^{total}$ is provided by totalNumberOfRA-Preambles.

If the CBRA initiated by UE/GNB is 4 step CBRA (1020, 1120), UE determines PRACH preambles for 4 step CBRA as follows:

N1: ssb-perRACH-Occasion configured/signaled for 4 step CBRA (1030, 1125)

R1: CB-PreamblesPerSSB configured/signaled for 4 step CBRA (1030, 1125)

If N1<1: Preambles starting from preamble index zero to 'R1−1' are used for 4 step CB RA (1035, 1130). Same set of preambles is used for each SSB. In other words, R1 contention based preambles with consecutive indexes associated with the SSB per valid PRACH occasion start from preamble index zero.

If N1>=1, R1 contention based preambles with consecutive indexes associated with SS/PBCH block n, 0≤n≤N1−1, per valid PRACH occasion start from preamble index 'n·$N_{preamble}^{total}$/N1, where $N_{preamble}^{total}$ is provided by totalNumberOfRA-Preambles (1040, 1135). In an embodiment, totalNumberOfRA-Preambles is the total number of preambles used for random access (contention based as well as contention free) and is configured by gNB. In another embodiment, totalNumberOfRA-Preambles is the total number of preambles used for random access (4 step contention based as well as contention free random access) and is configured by gNB.

For 2 step CBRA gNB can configure/signal the parameter groupBconfigured separately from 4 step CBRA. UE can determine the random access preambles for Random Access Preambles group A and B for 2 step CBRA according to parameter groupBconfigured and numberOfRA-PreamblesGroupA configured/signaled by gNB for 2 step CBRA as follows:

Amongst the contention-based Random Access Preambles associated with an SSB (determined using methods explained earlier) the first numberOfRA-PreamblesGroupA Random Access Preambles belong to Random Access Preambles group A. The remaining Random Access Preambles associated with the SSB belong to Random Access Preambles group B (if configured).

In an embodiment, groupBconfigured and numberOfRA-PreamblesGroupA configured/signaled by gNB for 4 step CBRA is also used for 2 step CBRA.

UE select a preamble amongst the preambles associated with selected SSB and selected preamble group (if multiple groups are configured). If Random Access Preambles group B is configured, UE selects Random Access Preambles group A or group B based on Msg3 size or based on Msg3 size and path loss. UE also select a PRACH occasion from PRACH occasions associated with selected SSB. UE then transmit selected preamble in selected PRACH occasion.

Figure 12:
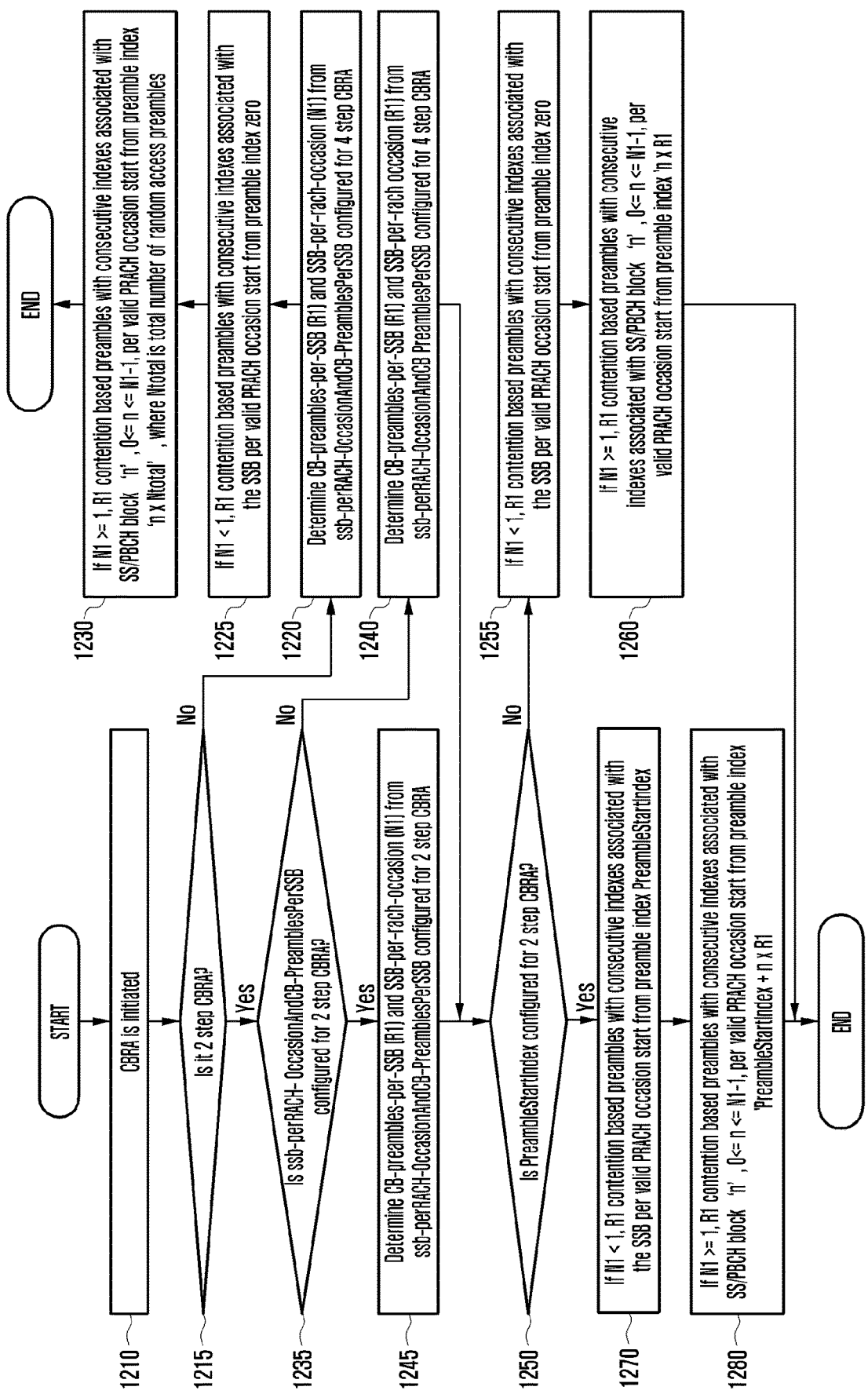
FIG. 12 illustrates a flow chart of determining random access preambles in accordance with an embodiment of the disclosure.

FIG. 12 illustrates a flow chart of determining random access preambles in accordance with an embodiment of the disclosure.

Embodiment 2-4: In one embodiment of this disclosure, it is proposed that that parameter ssb-perRACH-OccasionAndCB-PreamblesPerSSB is separately signaled by gNB for 2 step CBRA and 4 step CBRA in SIB 1 and in dedicated RRC signaling message (e.g. RRC Reconfiguration). ssb-perRACH-OccasionAndCB-PreamblesPerSSB is optionally signaled by GNB for 2 step CBRA. If ssb-perRACH- OccasionAndCB-PreamblesPerSSB is not signaled by gNB for 2 step CBRA, UE uses ssb-perRACH-OccasionAndCB-PreamblesPerSSB signaled for 4 step CBRA for 2 step CBRA.

For 2 step CBRA parameter PreambleStartIndex is optionally signaled by gNB. If PreambleStartIndex is not signaled by gNB for 2 step CBRA, UE assumes PreambleStartIndex is zero. The parameter PreambleStartIndex is not signaled for 4 step CBRA.

ssb-perRACH-OccasionAndCB-PreamblesPerSSB for 2 step CBRA can be configured/signaled by gNB in 2 step CBRA configuration (e.g. in RACH-ConfigCommon IE for 2 step) and ssb-perRACH-OccasionAndCB-PreamblesPerSSB for 4 step CBRA can be configured/signaled by gNB in 4 step CBRA configuration (e.g. in RACH-ConfigCommon IE for 4 step). Alternately, ssb-perRACH-OccasionAndCB-PreamblesPerSSB for 2 step CBRA and ssb-perRACH-OccasionAndCB-PreamblesPerSSB for 4 step CBRA can be configured/signaled by gNB in CBRA configuration (i.e. in RACH-ConfigCommon IE which is common for both 2 step and 4 step CBRA). It is to be noted that RACH configuration is per BWP.

If the CBRA initiated by UE/GNB is 2 step CBRA (1210, 1215), UE determines PRACH preambles for 2 step CBRA as follows:
- N1: ssb-perRACH-Occasion configured/signaled by gNB for 2 step CBRA (1235, 1245). If ssb-perRACH-Occasion is not signaled for 2 step CBRA, UE applies ssb-perRACH-Occasion configured/signaled by gNB for 4 step CBRA (1235, 1240). In an embodiment, ssb-perRACH-Occasion is configured in RACH configuration and is common for 2 step CBRA and 4 step CBRA.
- R1: CB-PreamblesPerSSB configured/signaled by gNB for 2 step CBRA (1235, 1245). If CB-PreamblesPerSSB is not signaled for 2 step CBRA, UE applies CB-PreamblesPerSSB configured/signaled by gNB or 4 step CBRA (1235, 1240). In an embodiment, CB-PreamblesPerSSB is configured in RACH configuration and is common for 2 step CBRA and 4 step CBRA.
- If N1<1: Preambles starting from PreambleStartIndex to 'PreambleStartIndex+R1−1' are used for 2 step CB RA (1250, 1270). Same set of preambles is used for each SSB. In other words, R1 contention based preambles with consecutive indexes associated with the SSB per valid PRACH occasion start from preamble index PreambleStartIndex. If PreambleStartIndex is not signaled by gNB for 2 step CBRA, UE assumes PreambleStartIndex is zero (1250, 1255). For example, let's say there are two SSBs with SSB index X and SSB index Y and N1=½. SSB X is associated with PRACH occasion 1 and PRACH occasion 2; SSB Y is associated with PRACH occasion 3 and PRACH occasion 4. Note that N1 is ½, so one SSB is associated with two PRACH occasions in association period. SSB X is associated with R1 preambles starting from preamble index PreambleStartIndex. SSB Y is associated with R1 preambles starting from preamble index PreambleStartIndex.
- If N1>=1, R1 contention based preambles with consecutive indexes associated with SSB n, 0≤n≤N1−1, per valid PRACH occasion start from preamble index 'PreambleStartIndex+n×R1' (1250, 1280). If PreambleStartIndex is not signaled by gNB for 2 step CBRA, UE assumes PreambleStartIndex is zero (1250, 1260). For example, let's say there are four SSBs with SSB index 1, SSB index 2, SSB index 3 and SSB index 4. and N1=2. As N1 is 2, this mean 2 SSBs are associated with one PRACH occasion. SSB index 1 and SSB index 2 is associated with PRACH occasion 1; SSB index 3 and SSB index 4 is associated with PRACH occasion 2. Note that PRACH occasions in association period are sequentially numbered first in frequency and then in time domain. SSBs are then mapped to these PRACH occasions in increasing order of SSB indexes. SSBs associated with a PRACH occasion are sequentially numbered starting from lower SSB index to higher SSB index. Since SSB index 1 and SSB index 2 are associated with same PRACH occasions, 'n' corresponding to these are 0 and 1 respectively. Similarly SSB index 3 and SSB index 4 are associated with same PRACH occasion, so 'n' corresponding to these are 0 and 1 respectively. So based on the above formula, R1 preambles associated SSB index 1 and SSB index 3 starts from 'PreambleStartIndex+0*R1' i.e. PreambleStartIndex. R1 preambles associated with SSB index 2 and SSB index 4 starts from 'PreambleStartIndex+1*R1'.

If the CBRA initiated by UE/GNB is 4 step CBRA (1215), UE determines PRACH preambles for 4 step CBRA as follows:
- N1: ssb-perRACH-Occasion configured/signaled by gNB for 4 step CBRA (1220). In an embodiment, ssb-perRACH-Occasion is configured in RACH configuration and is common for 2 step CBRA and 4 step CBRA.
- R1: CB-PreamblesPerSSB configured/signaled by gNB for 4 step CBRA (1220). In an embodiment, ssb-perRACH-Occasion is configured in RACH configuration and is common for 2 step CBRA and 4 step CBRA.
- If N1<1: Preambles starting from preamble index zero to 'R1−1' are used for 4 step CB RA (1225). Same set of preambles is used for each SSB. In other words, R1 contention based preambles with consecutive indexes associated with the SSB per valid PRACH occasion start from preamble index zero.
- If N1>=1, R1 contention based preambles with consecutive indexes associated with SS/PBCH block n 0≤n≤N1−1, per valid PRACH occasion start from preamble index 'n·$N_{preamble}^{total}$/N1, where $N_{preamble}^{total}$ is provided by totalNumberOfRA-Preambles (1230). In an embodiment, totalNumberOfRA-Preambles is the total number of preambles used for random access (contention based as well as contention free) and is configured by gNB. In another embodiment, totalNumberOfRA-Preambles is the total number of preambles used for random access (4 step contention based as well as contention free random access) and is configured by gNB.

Note that in an embodiment in which ssb-perRACH-OccasionAndCB-PreamblesPerSSB is always signaled for 2 step CBRA, in FIG. 12, the condition to check whether ssb-perRACH-OccasionAndCB-PreamblesPerSSB is configured for 2 step CBRA is not performed. In an embodiment in which preambleStartIndex is always signaled for 2 step CBRA, in FIG. 12, the condition to check whether preambleStartIndex is configured for 2 step CBRA is not performed.

Figure 13:
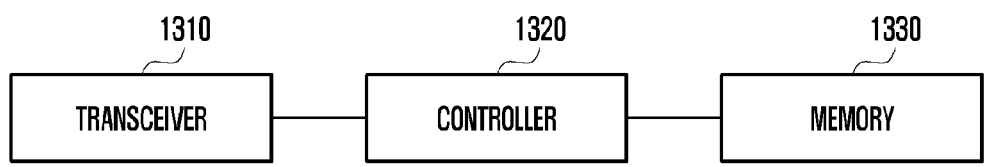
FIG. 13 is a block diagram of a terminal according to an embodiment of the disclosure.

FIG. 13 is a block diagram of a terminal according to an embodiment of the disclosure.

Referring to FIG. 13, a terminal includes a transceiver 1310, a controller 1320 and a memory 1330. The controller 1320 may refer to a circuitry, an application-specific integrated circuit (ASIC), or at least one processor. The transceiver 1310, the controller 1320 and the memory 1330 are configured to perform the operations of the UE illustrated in the figures, e.g. FIGS. 1 to 12, or described above. Although the transceiver 1310, the controller 1320 and the memory 1330 are shown as separate entities, they may be realized as a single entity like a single chip. Or, the transceiver 1310, the controller 1320 and the memory 1330 may be electrically connected to or coupled with each other.

The transceiver 1310 may transmit and receive signals to and from other network entities, e.g., a base station.

The controller 1320 may control the terminal to perform functions according to one of the embodiments described above. For example, the controller 1320 controls the transceiver 1310 and/or memory 1330 to determine random access preamble based on configuration information received from base station, to determine PRACH occasion based on configuration information received from base station, to transmit 2-step random access preamble to base station based on the determination.

In an embodiment, the operations of the terminal may be implemented using the memory 1330 storing corresponding program codes. Specifically, the terminal may be equipped with the memory 1330 to store program codes implementing desired operations. To perform the desired operations, the controller 1320 may read and execute the program codes stored in the memory 1330 by using a processor or a central processing unit (CPU).

Figure 14:
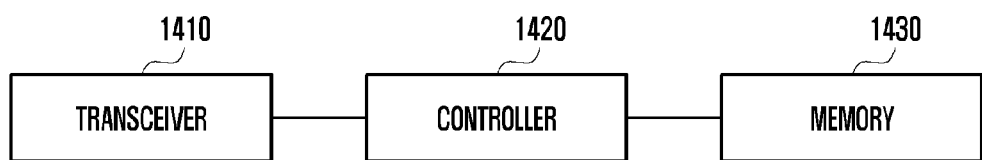
FIG. 14 is a block diagram of a base station according to an embodiment of the disclosure.

FIG. 14 is a block diagram of a base station according to an embodiment of the disclosure.

Referring to FIG. 14, a base station includes a transceiver 1410, a controller 1420 and a memory 1430. The controller 1420 may refer to a circuitry, an application-specific integrated circuit (ASIC), or at least one processor. The transceiver 1410, the controller 1420 and the memory 1430 are configured to perform the operations of the UE illustrated in the figures, e.g. FIGS. 1 to 12, or described above. Although the transceiver 1410, the controller 1420 and the memory 1430 are shown as separate entities, they may be realized as a single entity like a single chip. Or, the transceiver 1410, the controller 1420 and the memory 1430 may be electrically connected to or coupled with each other.

The transceiver 1410 may transmit and receive signals to and from other network entities, e.g., a terminal.

The controller 1420 may control the UE to perform functions according to one of the embodiments described above. For example, the controller 1420 controls the transceiver 1410 and/or memory 1430 to transmit configuration information for 2-step random access to terminal, and to receive 2-step random access preamble on a PRACH occasion based on the configuration information.

In an embodiment, the operations of the base station may be implemented using the memory 1430 storing corresponding program codes. Specifically, the base station may be equipped with the memory 1430 to store program codes implementing desired operations. To perform the desired operations, the controller 1420 may read and execute the program codes stored in the memory 1430 by using a processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a message including a first physical random access channel (PRACH) configuration index for a 4-step random access;
   in case that the message does not include a second PRACH configuration index for a 2-step random access, identifying a random access preamble for the 2-step random access based on a number N of synchronization signal blocks (SSBs) per PRACH occasion for the 4-step random access and a number of contention based preambles per SSB for the 2-step random access;
   identifying a PRACH occasion for the 2-step random access based on the first PRACH configuration index for the 4-step random access; and
   transmitting, to a base station, a message A (MSG A) including the random access preamble using the PRACH occasion,
   wherein, in case that the number N of SSBs per PRACH occasion for the 4-step random access is smaller than 1, the number of contention based preambles per SSB for the 2-step random access start from a preamble index R, the R being a number of contention based preambles per SSB for the 4-step random access, and
   wherein, in case that the number N of SSBs per PRACH occasion for the 4-step random access is larger than or equal to 1, the number of contention based preambles per SSB for the 2-step random access start from a preamble index $n \cdot N_{preamble}^{total}/N+R$, the n being an SSB index, and the $N_{preamble}^{total}$ being a total number of preambles for the 4-step random access.

2. The method of claim 1, wherein, in case that the message includes the second PRACH configuration index for the 2-step random access:
   the random access preamble for the 2-step random access is identified based on a number of SSBs per PRACH occasion for the 2-step random access and the number of contention based preambles per SSB for the 2-step random access, and
   the PRACH occasion for the 2-step random access is identified based on the second PRACH configuration index for the 2-step random access.

3. The method of claim 2, wherein, in case that the message includes the second PRACH configuration index for the 2-step random access:
   in case that the number of SSBs per PRACH occasion for the 2-step random access is smaller than 1, the number of contention based preambles per SSB for the 2-step random access start from a preamble index 0, and
   in case that the number of SSBs per PRACH occasion for the 2-step random access is larger than or equal to 1, the number of contention based preambles per SSB for the 2-step random access start from a preamble index $n \cdot N_{preamble}^{total}/N$, the n being an SSB index, and the $N_{preamble}^{total}$ being a total number of preambles for the 2-step random access.

4. The method of claim 1, wherein the message includes a system information block 1 (SIB1) or a radio resource control (RRC) reconfiguration message.

5. The method of claim 4, wherein the first PRACH configuration index and the second PRACH configuration index are for a specific uplink bandwidth part (BWP).

6. A method performed by a base station in a wireless communication system, the method comprising:
   transmitting, to a terminal, a message including a first physical random access channel (PRACH) configuration index for a 4-step random access; and
   receiving, from the terminal, a message A (MSG A) of a 2-step random access using a PRACH occasion, the MSG A including a random access preamble for the 2-step random access,
   wherein, in case that the message does not include a second PRACH configuration index for the 2-step random access, the random access preamble for the 2-step random access is based on a number N of synchronization signal blocks (SSBs) per PRACH occasion for the 4-step random access and a number of contention based preambles per SSB for the 2-step random access,
   wherein, in case that the number N of SSBs per PRACH occasion for the 4-step random access is smaller than 1, the number of contention based preambles per SSB for the 2-step random access start from a preamble index R, the R being a number of contention based preambles per SSB for the 4-step random access,
   wherein, in case that the number N of SSBs per PRACH occasion for the 4-step random access is larger than or equal to 1, the number of contention based preambles per SSB for the 2-step random access start from a preamble index $n \cdot N_{preamble}^{total}/N+R$, the n being an SSB index, and the $N_{preamble}^{total}$ being a total number of preambles for the 4-step random access, and
   wherein the PRACH occasion is based the first PRACH configuration index for the 4-step random access.

7. The method of claim 6, wherein, in case that the message includes the second PRACH configuration index for the 2-step random access:
   the random access preamble for the 2-step random access is based on a number of SSBs per PRACH occasion for the 2-step random access and the number of contention based preambles per SSB for the 2-step random access, and
   the PRACH occasion for the 2-step random access is based on the second PRACH configuration index for the 2-step random access.

8. The method of claim 7, wherein, in case that the message includes the second PRACH configuration index for the 2-step random access:
   in case that the number of SSBs per PRACH occasion for the 2-step random access is smaller than 1, the number of contention based preambles per SSB for the 2-step random access start from a preamble index 0, and
   in case that the number of SSBs per PRACH occasion for the 2-step random access is larger than or equal to 1, the number of contention based preambles per SSB for the 2-step random access start from a preamble index $n \cdot N_{preamble}^{total}/N$, the n being an SSB index, and the $N_{preamble}^{total}$ being a total number of preambles for the 2-step random access.

9. The method of claim 6, wherein the message includes a system information block 1 (SIB1) or a radio resource control (RRC) reconfiguration message.

10. The method of claim 9, wherein the first PRACH configuration index and the second PRACH configuration index are for a specific uplink bandwidth part (BWP).

11. A terminal in a wireless communication system, the terminal comprising:
   a transceiver configured to transmit or receive a signal; and
   a controller coupled with the transceiver and configured to:
      receive, from a base station, a message including a first physical random access channel (PRACH) configuration index for a 4-step random access,
      in case that the message does not include a second PRACH configuration index for a 2-step random access, identify a random access preamble for the 2-step random access based on a number N of synchronization signal blocks (SSBs) per (PRACH occasion for the 4-step random access and a number of contention based preambles per SSB for the 2-step random access,
      identify a PRACH occasion for the 2-step random access based on the first PRACH configuration index for the 4-step random access, and
      transmit, to a base station, a message A (MSG A) including the random access preamble using the PRACH occasion,
   wherein, in case that the number N of SSBs per PRACH occasion for the 4-step random access is smaller than 1, the number of contention based preambles per SSB for the 2-step random access start from a preamble index R, the R being a number of contention based preambles per SSB for the 4-step random access, and
   wherein, in case that the number N of SSBs per PRACH occasion for the 4-step random access is larger than or equal to 1, the number of contention based preambles per SSB for the 2-step random access start from a preamble index $n \cdot N_{preamble}^{total}/N+R$, the n being an SSB index, and the $N_{preamble}^{total}$ being a total number of preambles for the 4-step random access.

12. The terminal of claim 11, wherein, in case that the message includes the second PRACH configuration index for the 2-step random access:
   the random access preamble for the 2-step random access is identified based on a number of SSBs per PRACH occasion for the 2-step random access and the number of contention based preambles per SSB for the 2-step random access, and
   the PRACH occasion for the 2-step random access is identified based on the second PRACH configuration index for the 2-step random access.

13. The terminal of claim 12, wherein, in case that the message includes the second PRACH configuration index for the 2-step random access:
   in case that the number of SSBs per PRACH occasion for the 2-step random access is smaller than 1, the number of contention based preambles per SSB for the 2-step random access start from a preamble index 0, and
   in case that the number of SSBs per PRACH occasion for the 2-step random access is larger than or equal to 1, the number of contention based preambles per SSB for the 2-step random access start from a preamble index $n \cdot N_{preamble}^{total}/N$, the n being an SSB index, and the $N_{preamble}^{total}$ being a total number of preambles for the 2-step random access.

14. The terminal of claim 11, wherein the message includes a system information block 1 (SIB1) or a radio resource control (RRC) reconfiguration message.

15. The terminal of claim 14, wherein the first PRACH configuration index and the second PRACH configuration index are for a specific uplink bandwidth part (BWP).

16. A base station in a wireless communication system, the base station comprising:
    a transceiver configured to transmit or receive a signal; and
    a controller coupled with the transceiver and configured to:
        transmit, to a terminal, a message including a first physical random access channel (PRACH) configuration index for a 4-step random access, and
        receive, from the terminal, a message A (MSG A) of a 2-step random access using a PRACH occasion, the MSG A including a random access preamble for the 2-step random access,
    wherein, in case that the message does not include a second PRACH configuration index for the 2-step random access, the random access preamble for the 2-step random access is based on a number N of synchronization signal blocks (SSBs) per PRACH occasion for the 4-step random access and a number of contention based preambles per SSB for the 2-step random access,
    wherein, in case that the number N of SSBs per PRACH occasion for the 4-step random access is smaller than 1, the number of contention based preambles per SSB for the 2-step random access start from a preamble index R, the R being a number of contention based preambles per SSB for the 4-step random access,
    wherein, in case that the number N of SSBs per PRACH occasion for the 4-step random access is larger than or equal to 1, the number of contention based preambles per SSB for the 2-step random access start from a preamble index $n \cdot N_{preamble}^{total}/N+R$, the n being an SSB index, and the $N_{preamble}^{total}$ being a total number of preambles for the 4-step random access, and
    wherein the PRACH occasion is based the first PRACH configuration index for the 4-step random access.

17. The base station of claim 16, wherein, in case that the message includes the second PRACH configuration index for the 2-step random access:
    the random access preamble for the 2-step random access is based on a number of SSBs per PRACH occasion for the 2-step random access and the number of contention based preambles per SSB for the 2-step random access, and
    the PRACH occasion for the 2-step random access is based on the second PRACH configuration index for the 2-step random access.

18. The base station of claim 16, wherein the message includes a system information block 1 (SIB1) or a radio resource control (RRC) reconfiguration message.

19. The base station of claim 18, wherein the first PRACH configuration index and the second PRACH configuration index are for a specific uplink bandwidth part (BWP).

20. The base station of claim 17, wherein, in case that the message includes the second PRACH configuration index for the 2-step random access:
    in case that the number of SSBs per PRACH occasion for the 2-step random access is smaller than 1, the number of contention based preambles per SSB for the 2-step random access start from a preamble index 0, and
    in case that the number of SSBs per PRACH occasion for the 2-step random access is larger than or equal to 1, the number of contention based preambles per SSB for the 2-step random access start from a preamble index $n \cdot N_{preamble}^{total}/N$, being an SSB index, and $N_{preamble}^{total}$ being a total number of preambles for the 2-step random access.

\* \* \* \* \*